(12) United States Patent
Fukano et al.

(10) Patent No.: US 6,193,239 B1
(45) Date of Patent: *Feb. 27, 2001

(54) TUBE JOINT

(75) Inventors: Yoshihiro Fukano; Tetsuro Maruyama, both of Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/057,448

(22) Filed: Apr. 9, 1998

(30) Foreign Application Priority Data

Apr. 14, 1997 (JP) .................................................. 9-096252

(51) Int. Cl.$^7$ .................................................. F16L 21/02
(52) U.S. Cl. ........................ 277/615; 285/354; 285/370
(58) Field of Search .................................... 277/602, 615; 285/354, 370

(56) References Cited

U.S. PATENT DOCUMENTS 3,606,659 * 9/1971 Robbins .
5,364,134 * 11/1994 Anderson .................... 285/354 X
5,388,871 2/1995 Saitoh .
5,951,060 * 9/1999 Fukano et al. .
5,954,375 * 9/1999 Trickle et al. ................ 285/354 X
5,996,636 * 12/1999 Fukano et al. .

FOREIGN PATENT DOCUMENTS 25 10 886    9/1976   (DE) .
0 365 821    5/1990   (EP) .
2 373 012    6/1978   (FR) .
7-20471      5/1995   (JP) .

* cited by examiner

*Primary Examiner*—Anthony Knight
*Assistant Examiner*—Karlena D. Schwing
(74) *Attorney, Agent, or Firm*—Oblon, Spivak, McClelland, Maier & Neustadt, P.C.

(57) ABSTRACT

A tube joint is described which facilitates the connection of tubes having different internal diameters or calibers, simply by exchanging a nut member, an insert bush and a collar member for another nut member, another insert bush and another collar member, respectively, having sizes which are suitable for the tube which is to be connected to the tube joint, and in a state in which the joint body is connected to a fluid pressure apparatus.

8 Claims, 5 Drawing Sheets

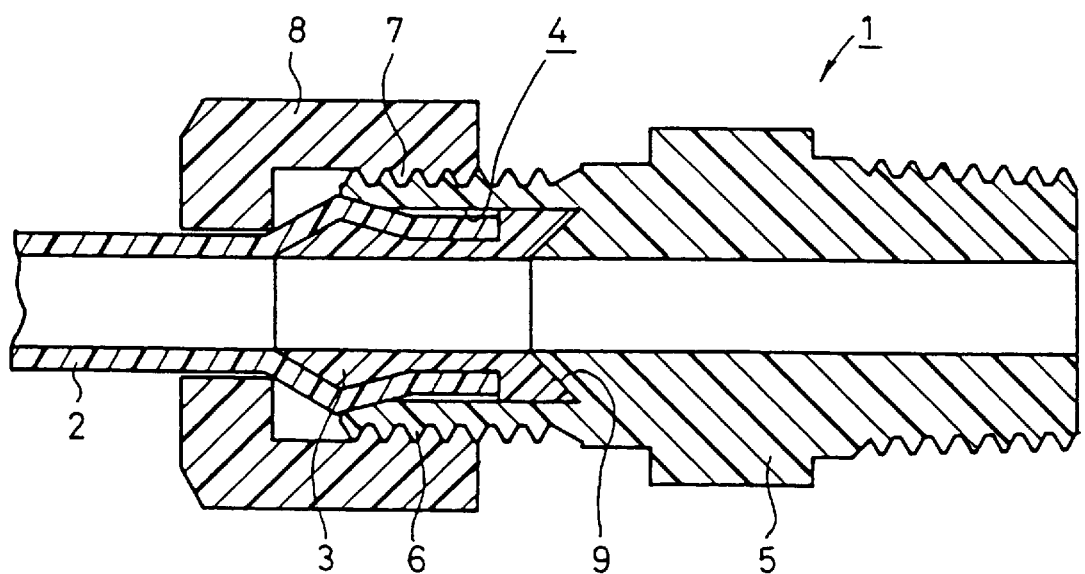
PRIOR ART FIG. 8

TUBE JOINT

BACKGROUND OF THE INVENTION

1. Field of the Invention

The present invention relates to a tube joint which makes it possible to connect, for example, a tube member such as a tube to a fluid pressure apparatus in a liquid-tight manner or in an air-tight manner.

2. Description of the Related Art

A tube joint concerning a conventional technique (see, for example, Japanese Utility Model Publication No. 7-20471) is shown in FIG. 8.

The tube joint 1 comprises an inner ring 3 for being pressed and inserted into one end of a tube member 2 so that the inner ring 3 protrudes from the one end of the tube member 2 to increase the diameter of the tube member 2 at the one end, and a main joint body 5 having a socket 4 formed at one end thereof for inserting a plug portion of the tube member 2 into which the inner ring 3 has been pressed and inserted. An external thread 6 is threaded over an outer circumference portion of the main joint body 5. A press ring 8 is externally fitted to the one end of the main joint body 5 through an internal thread 7 which engages with the external thread 6.

In this case, a seal section 9 is provided at a deep portion of the socket 4. The seal section 9 is formed to cross an axis of the socket 4 so that a seal section disposed at an inner end of the inner ring 3 protruding from the one end of the tube member 2 is allowed to abut against the deep portion of the socket 4. The sealing performance is secured by the aid of the seal section 9.

However, in the case of the tube joint 1 concerning the conventional technique, for example, when a pressurized fluid having different viscosity is used, it is necessary that the tube member 2, which has been once connected to the tube joint 1, should be exchanged for another tube member (not shown) having a different caliber. As a result, it is necessary to prepare a plurality of tube joints applicable to calibers of various tube members, resulting in an inconvenience that the equipment investment is expensive.

Further, in the case of the tube joint 1 concerning the conventional technique, when the tube member 2 is exchanged for another tube joint (not shown) having a different caliber, it is necessary that the entire tube joint 1 should be exchange. Therefore, it is required to perform the operation to remove the tube joint 1 connected to the fluid pressure apparatus, and perform the operation to attach the tube joint 1 thereto, in which the operation process is complicated.

Moreover, it is necessary to manage a plurality of tube joints corresponding to the calibers of the tube members 2, resulting in an inconvenience that the management cost is expensive.

Furthermore, the seal section 9 of the tube joint 1 concerning the conventional technique involves the following inconvenience. That is, the seal is effected in a state in which the seal section disposed at the inner end of the inner ring 3 makes surface-to-surface contact with the deep portion of the socket 4. Therefore, the force (pressure) for pressing the seal surface, i.e., the surface pressure exerted on the seal surface tends to be lowered, resulting in decrease in sealing performance.

SUMMARY OF THE INVENTION

A general object of the present invention is to provide a tube joint which can be easily exchanged for another tube joint having a different caliber.

A principal object of the present invention is to provide a tube joint which makes it possible to increase the surface pressure per unit area exerted on the seal surface so that the sealing performance is improved more reliably.

Another object of the present invention is to provide a tube joint which makes it possible to reduce the equipment investment and the management cost by commonly using a joint body upon exchange for another tube member having a different caliber.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 shows a vertical cross-sectional view illustrating the tube joint concerning the conventional technique.

DESCRIPTION OF THE PREFERRED EMBODIMENTS

Figure 1:
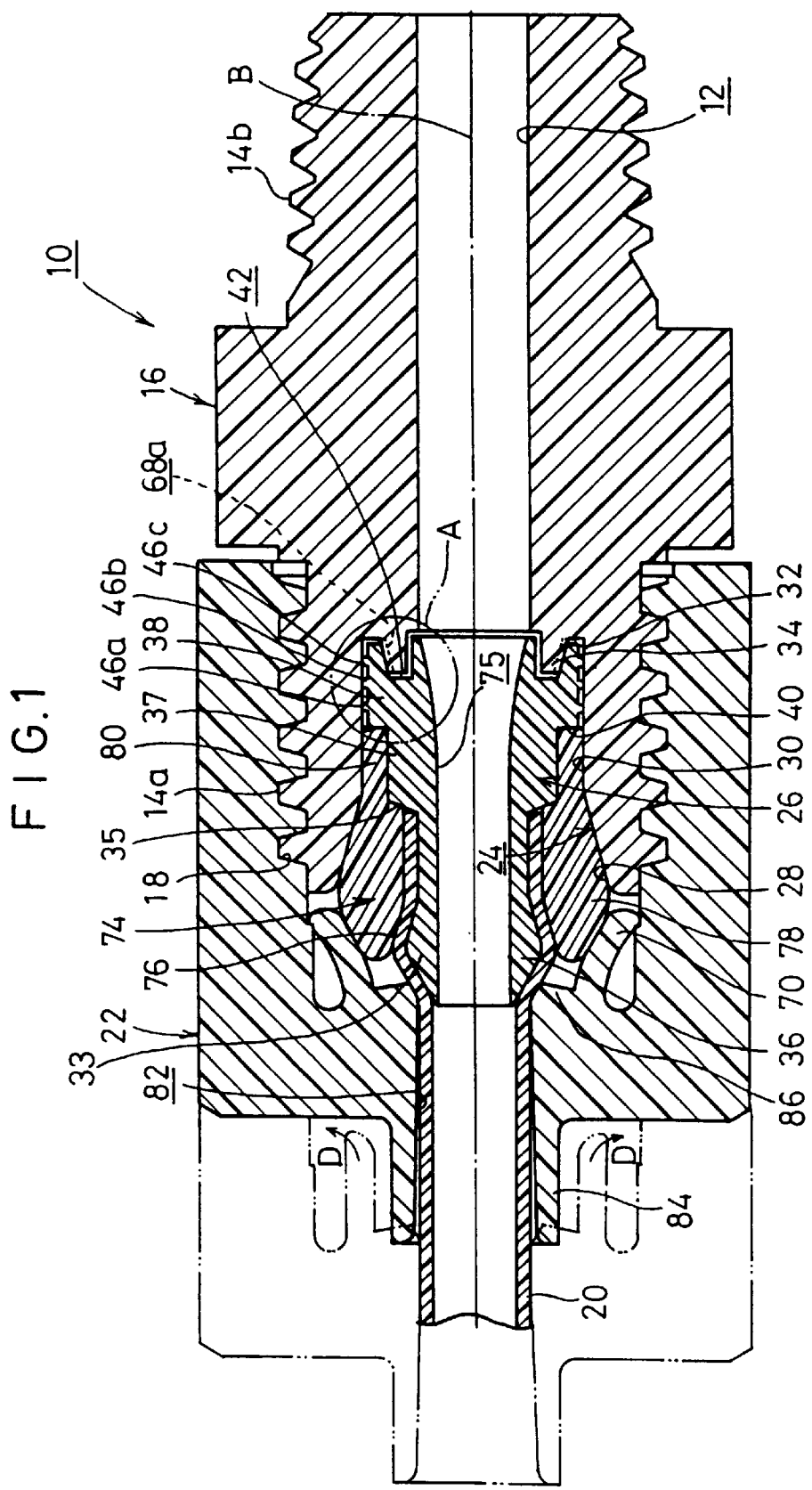
FIG. 1 shows a vertical cross-sectional view taken along an axial direction of a tube joint according to an embodiment of the present invention.

In FIG. 1, reference numeral 10 indicates a tube joint according to an embodiment of the present invention.

The tube joint 10 comprises a cylindrical joint body 16 and a nut member 22. The joint body 16 includes a through hole 12 formed along a direction of an axis B to function as a fluid passage, and first and second external threads 14a, 14b threaded over outer circumferential surface portions at both ends. The nut member 22 holds a tube (tube member) 20 on the joint body 16 by engaging an internal thread 18 threaded over an inner circumferential surface with the first external thread 14a so that the nut member 22 is fitted to one end of the joint body 16.

An insert bush (insert member) 26, which is in a state in which a part thereof protrudes from the one end of the tube 20, is inserted and fitted to an opening 24 of the joint body 16 over which the first external thread 14a is threaded. The opening 24 of the joint body 16 comprises a tapered surface 28 which starts from one end and which has its gradually reducing diameter, a cylindrical surface 30 which continues from the tapered surface 28 and which is formed to have a substantially identical or constant diameter, a deep plane 32 which is substantially perpendicular to the cylindrical surface 30, and an annular projection 34 which is formed between the deep plane 32 and the through hole 12 and which protrudes toward the tube 20 by a predetermined length. In this embodiment, the cylindrical surface 30 is formed to be substantially parallel to the direction of the axis B of the opening 24. Further, the annular projection 34 has its outer circumference which is formed to have a tapered cross section.

The insert bush 26 comprises an insert section 36 which has an annular expansion 33 expanding in the outer circumferential direction and which is inserted into the hole of the tube 20, a step section 37 which has an inclined surface 35 with its diameter gradually increasing from one end of the insert section 36, an annular expanded section 38 which is formed integrally with the insert section 36 and the step section 37 and which protrudes from one end of the tube 20, and a hole 75 which approximately corresponds to the caliber of the tube 20 and which penetrates from the insert section 36 along the expanded section 38.

One end of the tube 20 does not abut against the inclined surface 35 of the step section 37 of the insert bush 37. The former is separated from the latter by a sufficient spacing distance. A gap is formed between the inclined surface 35 and the end edge of the tube 20. Therefore, the tube 20 is not sealed by the inclined surface 35 of the step section 37 of the insert bush 26. It is noted that the arrangement described above is adopted because of the following reason. That is, if the tube 20 is intended to be sealed by using the inclined surface 35 of the step section 37 of the insert bush 26, it is necessary to provide a member for pressing the tube 20 toward the inclined surface 35, resulting in increase in the number of parts or components.

An annular step 40, which abuts against the end edge of a collar member described later on, is formed at a boundary between the step section 37 and the expanded section 38. The expanded section 38 is provided with an annular recess 42 for receiving the annular projection 34 of the joint body 16. Therefore, the annular recess 42 has its cross-sectional configuration which corresponds to a cross-sectional configuration of the annular projection 34.

Figure 2:
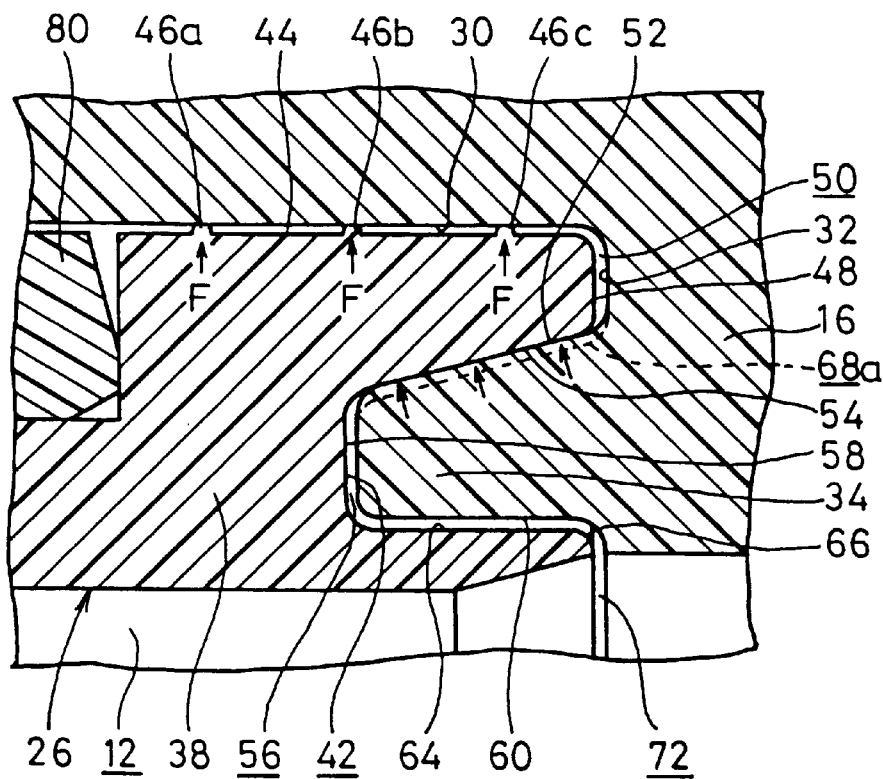
FIG. 2 shows a magnified view illustrating a portion A shown in FIG. 1.
Figure 3:
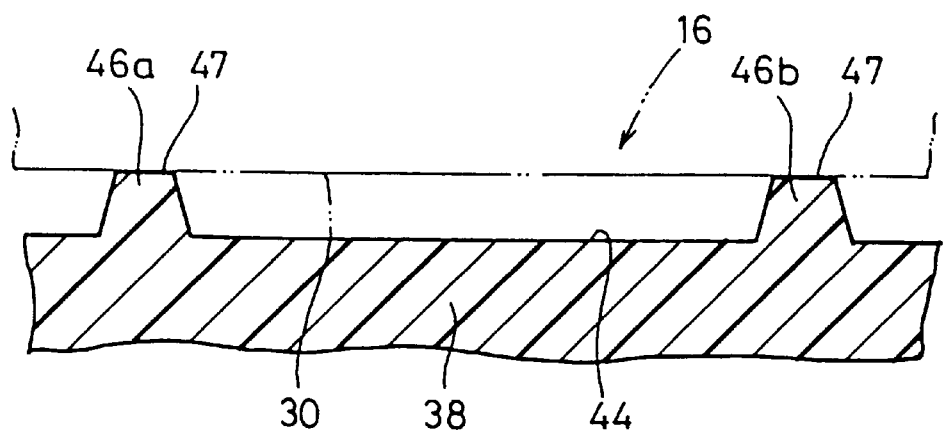
FIG. 3 shows a magnified view, with partial omission, of projections shown in FIG. 2.

As shown in FIG. 2, three stripes of projections (annular projections) 46a to 46c, which are separated from each other by a predetermined spacing distance, are formed annularly on a first surface 44 which is the outer circumferential surface of the expanded section 38. Each of the projections 46a to 46c is formed to have a trapezoidal cross section with its narrow-width and flat top surface 47 (see FIG. 3) which makes linear contact with the cylindrical surface 30 of the joint body 16.

The first surface 44 of the expanded section 38 is formed to be substantially parallel to the cylindrical surface 30 which is formed to be substantially parallel to the direction of the axis B of the opening 24. In other words, the cylindrical surface 30 of the joint body 16 and the first surface 44 of the insert bush 26 are formed to be substantially parallel to the direction of the axis B of the opening 24 respectively. In this embodiment, the flat top surfaces 47 of the projections 46a to 46c, which make linear contact with the cylindrical surface 30, are also formed to be substantially parallel to the direction of the axis B.

The expanded section 38 is formed with a second surface 48 which is in a non-contact state with respect to the deep plane 32 of the joint body 16. A first clearance 50 is formed between the second surface 48 of the expanded section 38 and the deep plane 32 of the joint body 16.

The annular recess 42 of the expanded section 38 comprises a third surface 54 which is inclined from the second surface 48 by a predetermined angle and which abuts against an inclined surface 52 of the annular projection 34 of the joint body 16, a fourth surface 58 which extends from the third surface 54 and which forms a second clearance 56 between itself and the top of the annular projection 34, a fifth surface 64 which is formed in a non-contact state with respect to a wall surface 60 of the annular projection 34 and which is formed to be substantially parallel to the direction of the axis B of the opening 24, and a sixth surface 66 which continues from the fifth surface 64 and which forms the end edge portion. A third clearance 72 is formed between the sixth surface 66 of the expanded section 38 and a bottom edge of the annular projection 34.

Therefore, the first surface 44 formed at the outer circumferential portion of the expanded section 38, the top surfaces 47 of the projections 46a to 46c formed on the first surface 44, and the fifth surface 64 formed on the annular recess 42 of the expanded section 38 are disposed substantially in parallel to the direction of the axis B of the opening 24 respectively. They are not disposed to cross the direction of the axis B. The formation of the first surface 44, the top surfaces 47, and the fifth surface 64 being substantially parallel to the direction of the axis B makes it possible to easily insert the insert bush 26 toward the deep portion of the opening 24 of the joint body 16.

Figure 4:
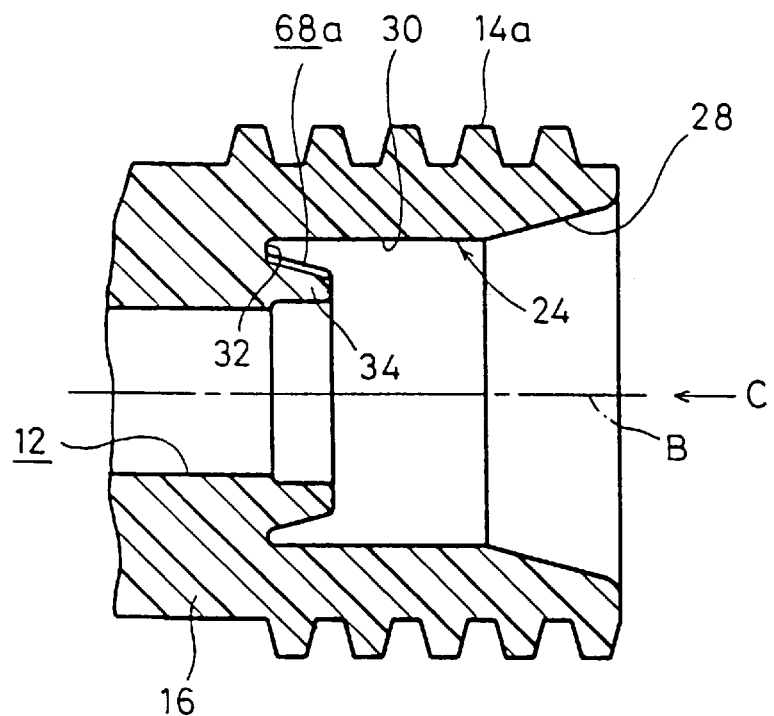
FIG. 4 shows a partial magnified view illustrating the tube joint shown in FIG. 1.
Figure 5:
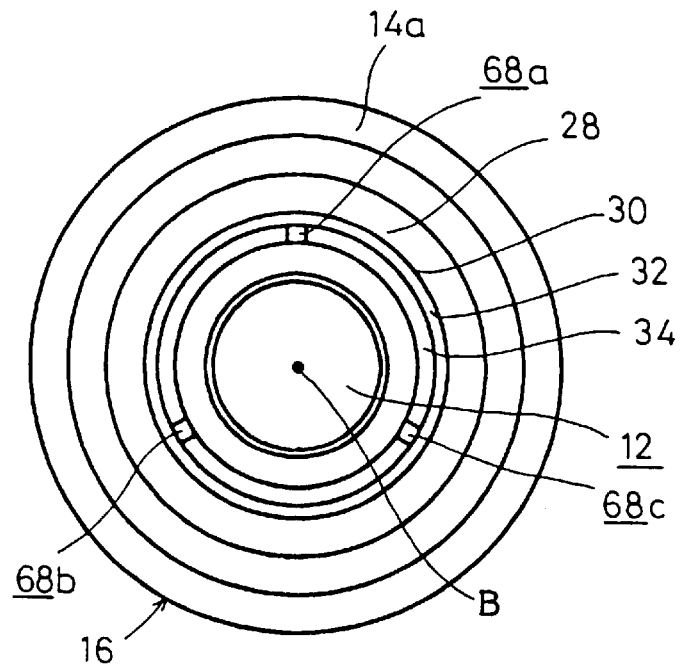
FIG. 5 shows a view as viewed in a direction indicated by an arrow C shown in FIG. 4.

As shown in FIGS. 4 and 5, a plurality of grooves 68a to 68c for making communication between the first clearance 50 and the second clearance 56 are formed over the inclined surface 52 of the annular projection 34 provided in the joint body 16. The plurality of grooves 68a to 68c are formed such that they are separated from each other by a predetermined angle and they extend radially along the radial direction.

A cylindrical collar member 74 is interposed between the tube 20 inserted and fitted to the insert section 36 of the insert bush 26 and the opening 24 of the joint body 24. The collar member 74 comprises a thick-walled section 78 which has a seal surface 76 for sealing one end of the tube 20 between the seal surface 76 and the annular expansion 33 of the insert bush 26 in accordance with the pressing action of a pressing section 70 of the nut member 22 as described later on, and a thin-walled section 80 which is inserted and fitted to the step section 37 of the insert bush 26 and which abuts against the expanded section 38 to be positioned and held thereby.

The nut member 22 has a through hole 82 which corresponds to the diameter of the tube 20 and which is formed along the direction of the axis B. The nut member 22 is formed with a guide section 84 for guiding the tube 20, the guide section 84 protruding from one end. The pressing section 70 for pressing the collar member 74 is formed to be flexibly bendable in a direction indicated by an arrow D, on a side opposite to the guide section 84.

In this embodiment, the pressing section 70 is bent flexibly in the direction of the arrow D by increasing the amount of screwing effected for the nut member 22. Thus, the tube 20 is interposed in a liquid-tight manner or in an air-tight manner between the collar member 74 and the pressing section 70. On the other hand, an annular edge 86, which has an acute-angled cross section for pressing the tube 20 toward the annular expansion 33 of the insert bush 26 and sealing the tube 20 between itself and the annular expansion 33 of the insert bush 26, is formed on an inner wall surface which is adjacent to the pressing section 70 of the nut member 22.

Preferably, the joint body 16, the nut member 22, the collar member 74, and the insert bush 26 are formed of resin materials.

It is enough for the projections 46a to 46c formed on the first surface 44 of the insert bush 26 that they are provided as two or more individuals, i.e., as a plurality of individuals, without being limited to the three stripes.

The tube joint 10 according to the embodiment of the present invention is basically constructed as described above. Next, its function and effect will be explained.

At first, the insert section 36 of the insert bush 26 is inserted and fitted to the hole at the one end of the tube 20. In this embodiment, the one end of the tube 20 does not abut against the inclined surface 35 of the step section 37 of the insert bush 26, and the gap is formed between the inclined surface 35 and the end edge of the tube 20. Therefore, the tube 20 is not sealed by the inclined surface 35 of the step section 37 of the insert bush 26. As a result, the diameter of the one end of the tube 20 is enlarged along the shape of the insert section 36, and the inner circumferential surface of the tube 20 and the outer circumferential surface of the insert section 36 are held in a liquid-tight manner or in an air-tight manner.

Subsequently, the one end of the tube 20, into which the insert bush 26 has been pressed and inserted, is inserted along the opening 24 of the joint body 16. The cylindrical collar member 74 is pressed and inserted into the space between the opening 24 of the joint body 16 and the tube 20 inserted and fitted to the insert section 36 of the insert bush 26.

Further, the internal thread 18 of the nut member 22, which has been loosely fitted to the tube 20 previously, is screwed along the first external thread 14a of the joint body 16 so that the nut member 22 is tightened. Thus, the tube 20 is held in a liquid-tight manner or in an air-tight manner in the opening 24 of the joint body 16.

That is, the collar member 74 and the insert bush 26 are pressed integrally with the tube 20 toward the deep portion of the opening 24 of the joint body 16 by the aid of the pressing section 70 by tightening the nut member 22. The tube 20 and the insert bush 26 are inserted until the third surface 54 of the insert bush 26 abuts against the inclined surface 52 of the annular projection 34 of the joint body 16. In this embodiment, the inclined surface 52 of the annular projection 34 of the joint body 16 functions as a stopper for restricting the terminal end of the displacement portion of the insert bush 26.

Once the insert bush 26 arrives at the terminal end of the displacement portion by being pressed along the direction of the axis B, the inclined surface, which forms the annular recess 42 of the insert bush 26, i.e., the third surface 54 is engaged with the inclined surface 52 of the annular projection 34 of the joint body 16, resulting in the state shown in FIG. 1.

In this process, the pressing section 70 of the nut member 22 is flexibly bent radially outwardly (in the direction of the arrow D) to correspond to the shape of the collar member 74. The collar member 74 is pressed toward the insert bush 26 by the force exerted by the pressing section 70 to restore the original shape. Therefore, the tube 20 is sealed between the seal surface 76 of the collar member 74 and the annular expansion 33 of the insert bush 26.

In the state shown in FIG. 1, the connecting portion between the tube joint body 16 and the tube 20 is held in a liquid-tight manner or in an air-tight manner by the aid of a first seal section which functions as a seal by allowing the top surfaces 47 of the projections 46a to 46c of the insert bush 26 to make linear contact with the cylindrical surface 30 of the joint body 16, a second seal section which functions as a seal by pressing the tube 20 toward the annular expansion 33 of the insert bush 26 by means of the annular edge 86 of the nut member 22, and a third seal section which functions as a seal by pressing the collar member 74 toward the insert bush 26 by means of the pressing section 70.

The first seal section sealed by the insert bush 26 is provided substantially in parallel to the direction of the axis B of the opening 24 of the joint body 16, which is not provided to cross the direction of the axis B. Therefore, in the present invention, no conformation of the seal is considered, and the structure is consequently simplified. Moreover, it is easy to attach and detach the insert bush 26, and the shape of a mold for production is also simplified.

As a result, the first, second, and third seal sections cooperate with each other, and thus the connecting portion between the joint body 16 and the tube 20 is held in a liquid-tight manner or in an air-tight manner.

In this embodiment, the second surface 48 of the expanded section 38 for constructing the insert bush 26 does not contact with the deep plane 32 of the opening 24. The first clearance 50 is formed between the second surface 48 and the deep plane 32 (see FIG. 2). The fourth surface 58 of the expanded section 38 does not contact with the top of the annular projection 34. The second clearance 56 is formed between the fourth surface 58 and the top of the annular projection 34 (see FIG. 2). The fifth surface 64 of the expanded section 38 and the wall surface 60 of the annular projection 34 are formed in the non-contact state. The third clearance 72 is formed between the sixth surface 66 of the expanded section 38 and the bottom edge of the annular projection 34. The third surface 54 of the insert bush 26 abuts against the inclined surface 52 of the annular projection 34. However, the first clearance 50 communicates with the second clearance 56 by the aid of the grooves 68a to 68c formed over the inclined surface 52.

The seal is effected only by the projections 46a to 46c which make linear contact between the expanded section 38 of the insert bush 26 and the opening 24 of the joint body 16. The seal is not effected at any other portion. Therefore, the sealing force of the projections 46a to 46c per unit area is increased, while it is unnecessary to consider any seal structure at any other portion. Accordingly, the structure is further simplified.

The force to press the third surface 54 in the direction of the arrow is exerted by the abutment of the inclined surface 52 of the annular projection 34 against the third surface 54 of the insert bush 26. The pressing force allows the force F to press the projections 46a to 46c toward the cylindrical surface 30 of the opening 24. As a result, the projections 46a to 46c are pressed toward the cylindrical surface 30. Thus, the seal is reliably effected, and the sealing performance can be improved.

In the embodiment of the present invention, the seal portion between the insert bush 26 and the joint body 16 is formed to make linear contact without causing surface-to-surface contact. Accordingly, the contact area is decreased, and the force to press the seal portion in accordance with the action of the pressurized fluid, i.e., the surface pressure of the seal surface is increased. Thus, it is possible to improve the sealing performance more reliably.

In the embodiment of the present invention, the grooves 68a to 68c are provided over the inclined surface 52 of the annular projection 34 of the joint body 16. Accordingly, the contact area of the inclined surface 52 which abuts against the third surface 54 of the insert bush 26 can be reduced to decrease the contact resistance.

Next, the process for exchanging the tube 20 for other tubes 20a, 20b having different calibers will be explained.

Figure 6:
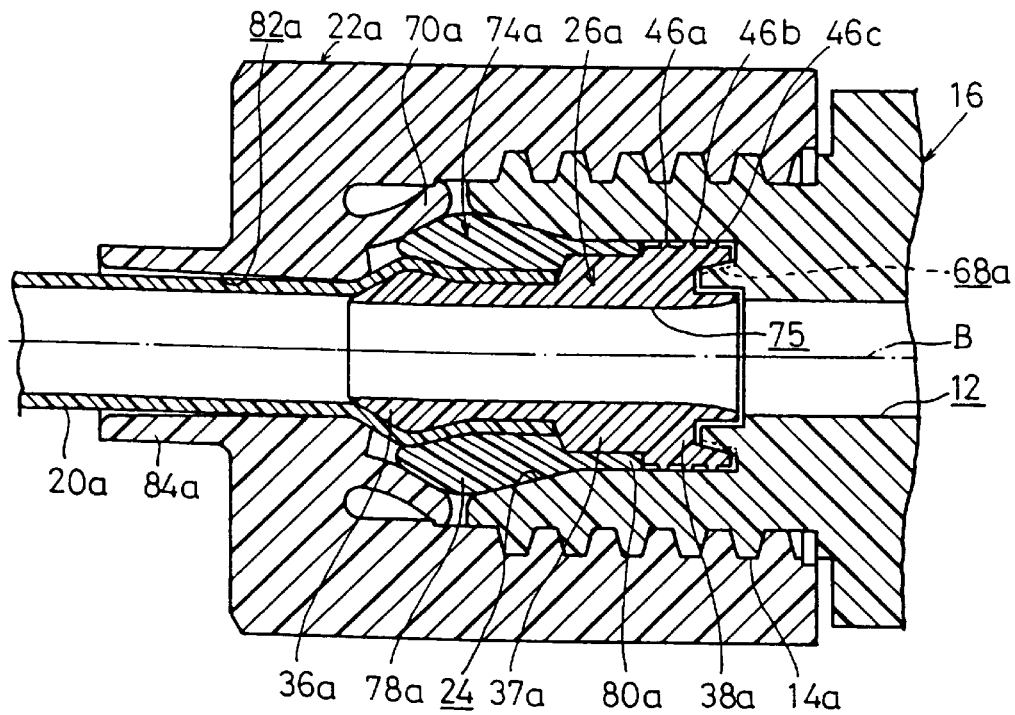
FIG. 6 shows a cross-sectional view illustrating a state in which another tube having a large caliber is inserted into the tube joint shown in FIG. 1.
Figure 7:
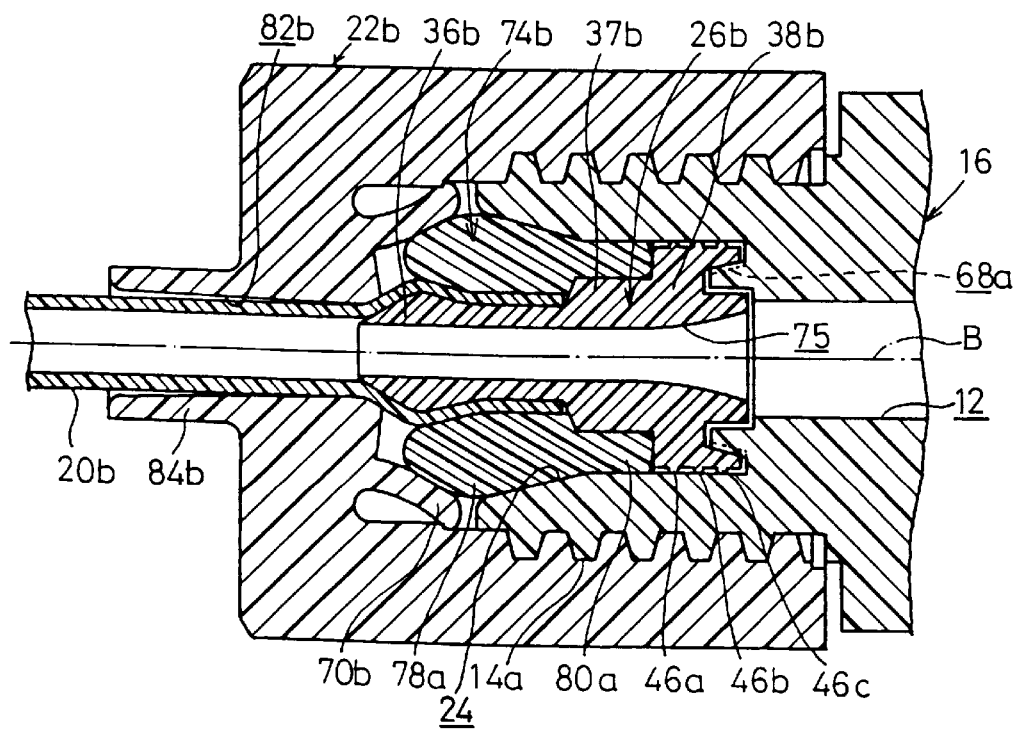
FIG. 7 shows a cross-sectional view illustrating a state in which another tube having a small caliber is inserted into the tube joint shown in FIG. 1.

FIG. 6 shows a case of exchange for a tube 20a having a caliber which is larger than that of the tube 20 used in FIG. 1. FIG. 7 shows a case of exchange for a tube 20b having a caliber which is smaller than that of the tube 20 used in FIG. 1. In FIGS. 6 and 7, constitutive components or parts corresponding to those shown in FIG. 1 are designated by the same reference numerals but affixed with characters "a" and "b" respectively, and they will be commonly explained.

Starting from the state shown in FIG. 1, the nut member 22 is loosened to remove the nut member 22, the collar member 74, and the insert bush 26 from the joint body 16 respectively. During this process, the joint body 16 is not removed, and it remains in the state of being connected to the unillustrated fluid pressure apparatus.

Next, as shown in FIGS. 6 and 7, an insert bush 26a, 26b and a collar member 74a, 74b, which have shapes corresponding to the caliber of the tube 20a, 20b to be exchanged, are previously prepared. The insert bush 26a, 26b and the collar member 74a, 74b are inserted into the opening 24 of the joint body 16.

Subsequently, an internal thread 18a, 18b of the nut member 22a, 22b formed with a through hole 82a, 82b corresponding to the caliber of the tube 20a, 20b to be exchanged is screwed along the first external thread 14a of the joint body 16, and the nut member 22a, 22b is tightened. Thus, the state shown in FIG. 6 or 7 is achieved, and the exchange operation for the tube 20a, 20b is completed.

A hole 75, which communicates with the through hole 12 of the joint body 16 and which corresponds to the caliber of the tube 20a, 20b, is formed through the insert bush 26a, 26b. The collar member 74a, 74b is formed to have a wall thickness which is thin (see FIG. 6) or a wall thickness which is thick (see FIG. 7), corresponding to the caliber of the tube 20a, 20b.

In the tube joint 10 according to the embodiment of the present invention, the joint body 16 is commonly used, and the nut member 22a, 22b, the collar member 74a, 74b, and the insert bush 26a, 26b corresponding to any of the tubes 20a, 20b having various calibers are previously prepared. Thus, the nut member 22a, 22b, the collar member 74a, 74b, and the insert bush 26a, 26b may be merely exchanged corresponding to the tube 20a, 20b to be exchanged, in the state in which the joint body 16 is connected to the fluid pressure apparatus, without removing the joint body 16 having been once connected to the fluid pressure apparatus.

It is a matter of course in the embodiment of the present invention that the nut member 22a, 22b, the collar member 74a, 74b, and the insert bush 26a, 26b corresponding to any of the tubes 20a, 20b having various calibers are not limited to those of the two types shown in FIGS. 6 and 7.

Therefore, the embodiment of the present invention is different from the conventional technique in that it is unnecessary to remove the entire tube joint 10 from the fluid pressure apparatus when the tube 20 connected to the fluid pressure apparatus is exchanged for another tube 20a, 20b having the different caliber. Accordingly, an effect is obtained in the embodiment of the present invention in that the exchange operation for the tube 20 can be easily performed.

In the embodiment of the present invention, even when the caliber of the tube 20, 20a, 20b differs, the joint body 16 can be commonly used. It is unnecessary to exchange the entire tube joint 10 corresponding to the caliber of the tube 20, 20a, 20b to be exchanged. Therefore, it is possible to reduce the equipment investment and the management cost as compared with the conventional technique.

What is claimed is:

1. A tube joint comprising:

a joint body having a through hole for being used as a fluid passage formed along an axial direction, and including a thread formed at least at one end;

a nut member for being engaged with said one end of said joint body through said thread to connect a tube member to said joint body;

an insert member for being inserted and fitted to an opening of said joint body, said insert member having an insert section to be inserted into said tube member and an expanded section protruding from one end of said tube member; and a collar member for being interposed between said tube member inserted into said insert section of said insert member and said opening of said joint body, wherein said nut member, said insert member and said collar member are capable of being exchanged with another nut member, another insert member and another collar member which are suitable for connection to another tube member having a different caliber.

2. The tube joint according to claim 1, wherein said insert member has said expanded section formed by an outer circumferential surface which extends in parallel to said axial direction of said through hole of said joint body, and a plurality of annular projections, which function as seals to contact with an inner wall surface for forming said opening of said joint body, are formed on said outer circumferential surface along said axial direction of said opening, said annular projections being separated from each other by a predetermined spacing distance.

3. The tube joint according to claim 2, wherein said annular projections are formed annularly on a first surface which defines said outer circumferential surface of said expanded section, and said annular projections contact with said inner wall surface of said joint body, said inner wall surface being cylindrical.

4. The tube joint according to claim 3, wherein said first surface of said expanded section and said cylindrical surface of said joint body are formed substantially in parallel to said axial direction of said through hole respectively.

5. The tube joint according to claim 1, wherein a clearance is formed between one end of said expanded section along said axial direction of said insert member and said opening of said joint body.

6. The tube joint according to claim 5, wherein an annular recess is formed at one end of said expanded section of said insert member, an annular projection corresponding to said annular recess is formed at said opening of said joint body, and a plurality of grooves, which expand radially, are formed over an inclined surface of said annular projection.

7. The tube joint according to claim 5, wherein said clearance includes a first clearance formed between a second surface as an end surface of said expanded section and a deep plane of said joint body, a second clearance formed between an annular recess of said expanded section and an annular projection of said joint body, and a third clearance formed between a sixth surface of said expanded section and a bottom edge of said annular projection.

8. The tube joint according to claim 1, wherein said nut member is formed with a through hole therein, said insert member is formed with a hole and collar member has a predetermined wall thickness, said through hole, said hole and said predetermined wall thickness having respective sizes which are suitable for the tube member to be connected to said joint body.

* * * * *